Figure 1:
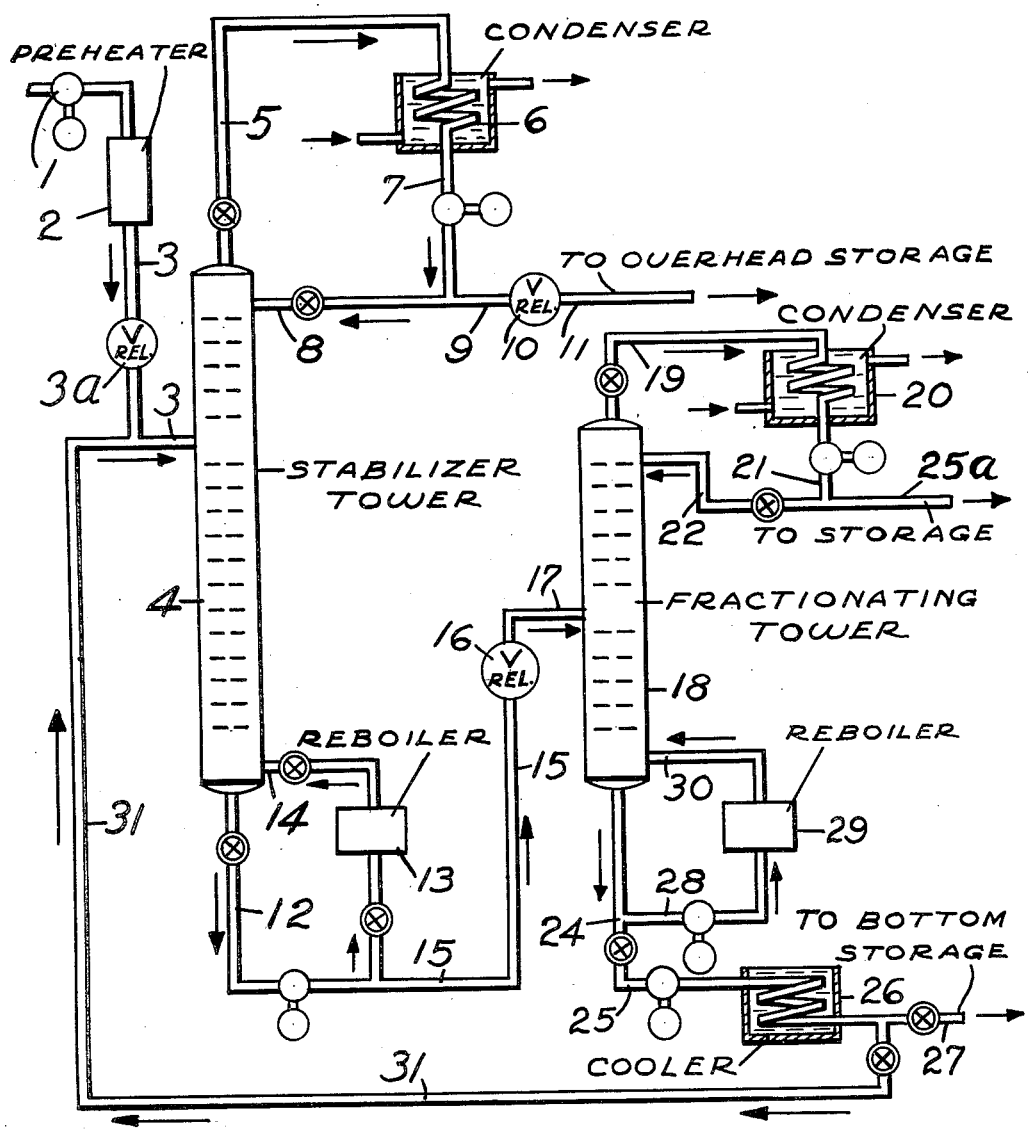

Warren M. Smith, Inventor
By Henry Berk, Attorney

Patented Oct. 14, 1952

2,614,070

UNITED STATES PATENT OFFICE 2,614,070

HEAT TREATING AND DISTILLATION OF OXO ALCOHOLS

Warren M. Smith, Baton Rouge, La., assignor to Standard Oil Development Company, a corporation of Delaware Application November 16, 1949, Serial No. 127,628

5 Claims. (Cl. 202—51)

This invention relates to improvements for the purification of crude alcohols, by a distillation procedure. More specifically the invention relates to an improved distillation method for purifying higher boiling Oxo alcohols which contain impurities of the type tending to undergo decomposition at the normal boiling point of the Oxo alcohol undergoing purification by distillation.

In practicing this invention, the crude Oxo alcohols containing the impurities are subjected to a thermal treatment at elevated pressure for a sufficient period of time to decompose and/or convert the higher boiling impurity compounds present in the crude Oxo alcohols to some other materials, generally easily volatilizable materials, which are removed from the Oxo alcohol products by distillation. The heat treatment is carried out in one zone and the materials more volatile than the alcohol are removed from this zone as overhead while the bottoms product containing substantially all the Oxo alcohol is discharged to a second distillation zone operating preferably at a lower pressure and slightly lower temperature, from which zone the Oxo alcohol, relatively free of both more volatile and higher boiling impurities is taken off as overhead product.

A number of alcohols which are of great commercial importance are prepared by synthetic processes and especially by the so-called Oxo reaction. The term "Oxo reaction" is a term used to describe the preparation of oxygenated organic compounds by the reaction of carbon monoxide and hydrogen with olefinic hydrocarbons in the presence of a carbonylation catalyst. The method is used particularly for the manufacture of various primary alcohols, specifically octyl alcohols, by operations involving interaction of carbon monoxide, hydrogen, a hydrocarbon mixture containing substantial amounts of heptenes, and a cobalt carbonylation catalyst to form octyl aldehydes, and subsequent reduction of these octyl aldehydes by catalytic hydrogenation to a mixture relatively high in octyl alcohols.

Primary alcohols of this general type are of great economic importance and interest because of their use as intermediates in the manufacture of plasticizers of di-ester type. Those considered to be particularly valuable are the di-esters of phthalic and maleic acids. The Oxo reaction and subsequent hydrogenation have been found to comprise a highly economical and valuable method for manufacturing octyl alcohols from cheap and readily available hydrocarbon materials.

In the Oxo or carbonylation stage of the process a large number of different types of reactions take place to form a variety of products. The chief primary reaction products as outlined above are aldehydes. These aldehydes themselves can undergo further reactions to yield other products. For instance, the aldehydes condense with each other to yield aldols. At least a part of the aldols undergo dehydration to yield alpha-beta-unsaturated aldehydes. Some ketones are also formed under the reaction conditions. A part of the aldehydes formed in the reaction zone is hydrogenated to alcohols and the alcohols so formed react with aldehydes and ketones present to give mixtures of acetals, hemi-acetals, and ketals. These compounds can undergo further reactions, including dehydration, to give ethers, particularly those of the unsaturated types. The alcohols can esterify the acids present to give esters. Hydrogenation of a part of the olefin starting feed stock, as well as some deoxygenation of oxygenated intermediates, gives some hydrocarbons in the final Oxo product mixture. In addition, other more complex and less known reactions also occur between the various intermediates and products obtained thereby yielding a mixture of higher boiling impurities and contaminants of the oxygenated type.

In the hydrogenation stage, the mixtures of acids, saturated and unsaturated aldehydes, alcohols, ethers, aldol condensation products, glycols, acetals, ketals and esters are hydrogenated in the presence of a suitable hydrogenating catalyst to yield more saturated products containing a higher percentage of alcohols and non-olefinic compounds. The product from the hydrogenation stage is essentially alcoholic in nature, with various impurities. Some of these impurities, especially the unsaturated ethers, acetals, ketals, aldols and esters are quite unstable toward heat. For instance, in general, the aldols, acetals, hemi-acetals and ketals have a great tendency to undergo degradative decomposition reactions whenever the alcohol is subjected to a simple atmospheric distillation. In many cases, thermally unstable esters are present and undergo both thermal and hydrolytic decompositions under distillation conditions.

To be more specific, if a crude fraction of iso-octyl alcohol as produced by the oxonation of $C_7$ olefins, followed by hydrogenation, is distilled either in a batch or continuous manner and cuts removed according to increasing boiling point, then the following fractions can be isolated:

1. A fraction containing unconverted olefin hydrocarbons, saturated hydrocarbons, and unhydrogenated aldehydes.

2. A fraction containing principally iso-octyl alcohol contaminated with decomposition products of aldols, hemi-acetals, acetals, ketals, esters, ethers, and the like.

3. A fraction containing higher boiling materials including esters and unsaturates of low volatility, higher alcohols, decomposition products of acetals and undecomposed acetals, ethers, and ketals.

A mechanism which fits the facts in a general fashion may be formulated in which it is assumed that decomposition reactions of various thermally and hydrolytically unstable materials proceed to an appreciable extent at the normal distillation temperature of the alcohol being purified, in this particular case, the iso-octyl alcohol. The decomposition reactions occurring produce water, especially by aldol dehydration, and this water probably contributes further to decomposition reactions by its hydrolytic action, especially on such impurities as esters, ketals, acetals and unsaturated ethers. The more volatile of the decomposition products, including various saturated and unsaturated aldehydes, water, and alcohols (including both iso-octyl and other alcohols of lower boiling point), go overhead with the alcohol product and contaminate the latter since all these products frequently boil within the same range. Any aldehydes, which are usually quite volatile, are distilled over with the alcohol fraction in this manner and subsequently combine very readily with the distilled alcohol product, reforming acetals and hemi-acetals, which are likewise subject to a second and similar decomposition process when a redistillation of the alcohol fraction is attempted for further purification. Aldehydes and other low boiling decomposition products are objectionable because they lower over-all product purity, and, due to instability, cause difficulties in the use of the alcohol especially when it is used as an esterification reactant.

It can readily be seen that it is difficult, if not impossible, to remove completely these acetals, aldehydes, and other interfering impurities from alcohols produced by such methods as the Oxo reaction using straight distillation and using successive steps for removing fractions of increasing boiling points. The presence of free aldehydes or potentially free aldehydes such as acetals or hemi-acetals in any kind of commercial alcohol product is objectionable for a number of reasons. Aldehydic compounds are relatively unstable toward air, elevated temperatures, and other variously encountered conditions to which ordinary chemicals are exposed when stored. As a result, impurities such as color bodies are produced upon storage, especially under varying temperature conditions. Any aldehydes present in the alcohol react readily with a part of the alcohol, thereby reducing the amount of total alcohol present and the amount which would be readily available for other chemical reactions. Perhaps the most important commercial use for these higher molecular weight alcohols, such as the $C_8$ iso-octyl alcohols produced by the Oxo reaction, is in esterification reactions to form compounds of the di-ester type for use as plasticizers in resin and plastic compositions. Those of the phthalate and adipate type are widely manufactured. Although an alcohol product of a synthetic source appears to be perfectly colorless, it frequently contains small amounts of impurities which form colored bodies during the subsequent esterification reaction. These colored materials are difficult to remove from the resulting high-boiling ester products and result in inferior esters which require additional and excessive purification prior to their use as plasticizers.

It can thus be seen that it is highly desirable to have the alcohol products such as those obtained in the Oxo reaction, as free of aldehydes, acetals, and other chemically reactive and thermally unstable substances as possible, particularly if they are to be used later for the production of plasticizer materials.

This same type of problem of unstable impurities also exists in connection with other alcohols made by the Oxo reaction, particularly for alcohols of the range of $C_4$ to $C_{15}$ or higher. For example, the $C_9$ alcohols, prepared by the reaction of $C_8$ olefins such as diisobutylene with carbon monoxide and hydrogen may be purified in the same manner as that described herein for the purification of the $C_8$ Oxo alcohols.

This novel distillation process can be used for purification of alcohols containing thermally unstable high boiling impurities obtained from any source, and is especially applicable to treatment of alcohols having from 4 to 15 carbon atoms. It finds particular application in purification of alcohols obtained by the so-called Oxo reaction mentioned above and especially to alcohols of the $C_8$ and $C_9$ class, although the process can also be applied advantageously for other alcohols containing similar types of thermally unstable impurities, particularly alcohols obtained by hydrogenation of carbonyl compounds.

A typical $C_8$ crude Oxo alcohol mixture such as can be employed as starting feed in this improved purification process has the following composition:

| | Weight per cent |
|---|---|
| Alcohol as $C_8$ | 65.0 |
| Aldehyde as $C_8$ | 1.8 |
| Acetal as $C_{24}$ | 3.7 |
| Ester as $C_9$ | 3.0 |
| Unsaturates as $C_7$ | 6.3 |
| Acid as $C_8$ | 0.1 |
| Water | 2.0 |
| Saturates and unknowns | 18.1 |

The high-boiling impurities including the acetals, hemi-acetals, esters and ethers, which ordinarily occur in the Oxo alcohols cannot withstand continued heating at elevated temperatures without undergoing serious and extensive decomposition to give volatile products causing contamination of the final alcohol product.

In the first stage, there is carried out a heat treating of the crude Oxo alcohol mixture including any acetals, hemi-acetals, and other thermally unstable compounds followed by a vaporization and removal of the materials more volatile than the alcohol. This heating treatment may be done in any type of conventional still column or it may even be done in a kind of heat soaking drum, thereafter passing the mixture to a still for removal of volatiles as overhead. One critical factor in this first stage heating and distillation is that the bottoms temperature must be maintained sufficiently high to cause a substantially complete decomposition of the heat-unstable impurities, thereby releasing at least a major portion of the combined alcohol as well as volatile decomposition products. The bottoms should always be above the normal boiling point of the alcohol, and generally considerably above it. For $C_8$ alcohol, the amount of material taken overhead comparative to the amount of bottoms allowed to remain in the still will depend on the degree of decomposition of acetals and other unstable compounds obtainable at the bottoms temperature employed as well as on the precise composition of the impurities in the alcohol since some types of impurities may be decomposed to a somewhat greater extent by the heat treatment, and others may be extremely resistant to thermal attack. The overhead vapor temperature of the first distillation stage should not be high enough to permit too great an amount of alcohol passing overhead in the volatiles, thus it should not be in excess of the boiling range of the particular alcohol product being purified. The residence time for the alcohol and impurities in this heat treating zone will depend on temperatures and pressures. The temperature and residence times are roughly qualitatively interchangeable. For the iso-octyl alcohols the bottoms temperatures during the heat treating should be at least 600° F. and preferably are maintained at somewhat over this minimum. This high temperature is maintained by the use of a pressure in the first thermal heating stage. The bottoms temperature necessary in the first stage for substantial cracking of the unstable high boiling impurities will depend to a more or less extent on the exact nature of the alcohol being purified but will frequently be in excess of the boiling point of the alcohol.

In the second stage of operation, the bottoms from the first stage containing the alcohol and any high boiling impurities is passed to a second vaporization or distillation zone.

The temperatures in this column are substantially lower than those of the first distillation zone. Conveniently, the column is operated at atmospheric pressure or at subatmospheric pressure. The desired alcohol product is removed overhead from this column. This overhead product will be substantially pure Oxo alcohol free of volatile degradation products as well as high boiling, color forming impurities.

High boiling, undecomposed impurities are obtained as bottoms from the second stage distillation zone.

Since, in general, for efficient operation, it would seem desirable to recover ultimately the combined alcohol remaining in the bottoms from the alcohol recovery tower, these bottoms may be recycled to the first distillation stage for further decomposition. The process may generally be operated with good results within the range of conditions in Table I below:

*Table I*

|  | Tower (1) | Tower (2) |
| --- | --- | --- |
| Bottoms or Pot Temperature | 530° to 750° F | 450° to 550° F. |
| Tower Pressure | 20 to 200 #/sq. in. gauge. | atmos. to 5 #/sq. in. gauge. |
| Residence Time | ¼ to 10 hours | ¼ to 5 hours. |

The degree of purification accomplished by this process can readily be evaluated in any number of ways. One of the simplest is by observation of the number of degrees of spread in boiling range of the alcohol product obtained. As is the general rule in chemical practice, the narrower boiling range is an indication that a purer product has been obtained. Color stability tests, particularly those involving esterification, can also be used to give an indication of any color producing impurities present.

Generally, the esterification tests are carried out by refluxing together phthalic anhydride and a slight excess of the Oxo alcohol for a time sufficient to permit substantially complete esterification of the anhydride. The excess alcohol is removed and the color of the ester determined and expressed in terms of a Hazen ester color number, on the Pt-Co scale, a high number indicating a darkened, low quality ester product. This standard test for ester color is widely used in the literature and in the trade. It is described in A. S. T. M. D 268–46.

Other modifications within the spirit of the invention will also be suggested to one skilled in distillation techniques. In any case, regardless of the exact manner in which the alcohol product is removed from the small quantity of residual high boilers, it is highly desirable to maintain as low a bottoms temperature in the second vaporization step as possible and preferably not to allow a temperature appreciably higher than the boiling range of the alcohol itself. As one alternate method of operation, the first stage operation may be carried out at atmospheric pressure and the second stage conducted at subatmospheric pressures with temperatures adjusted accordingly. It is also considered to be within the scope of this invention to subject the alcohol to the thermal treatment in a soaking drum and transfer the heat treated products afterward to a distillation zone for removal of volatiles.

In the accompanying drawing there is shown diagrammatically a form of distillation equipment and its accessory apparatus in which a preferred modification of the invention may be carried out.

EXAMPLE 1

This example will be described with reference to Figure 1. A mixture of crude octyl alcohols, prepared by catalytic reaction of carbon monoxide and hydrogen with $C_7$ olefins with a composition such as that shown above, is passed by line 1 into a preheater 2 and is passed through control valve 3a and subsequently into an intermediate point of tower 4, this tower having 30 plates. The crude alcohol preheated feed is preferably introduced at a location about plate 15 of tower 4. Tower 4 is maintained under about 50 p. s. i. g. pressure and the liquid bottoms are heated to temperatures of at least 600° F. The material in the column is heated by employing reboiler 13 as follows: the bottoms are withdrawn from still 4 through pipe 12 and passed by line 12 in part into a heater 13 and thence returned to the stabilizer tower 4. The remainder of the bottoms removed in line 12 is discharged into about plate 6 of a second distillation zone, a 12 plate fractionating tower 18 via lines 15 and 17 carrying a pressure reducing valve 16. A partial condenser may be used in line 15, if desired. The reflux ratio in stabilizer tower 4 is preferably about 12:1. The heat which must be furnished by the reboiler 13 must be of an amount to equal the heat lost overhead plus heat lost by radiation from the column. There is removed overhead by line 5 from stabilizer tower 4 a stream of light volatile products, both materials existing in the Oxo alcohol originally and more degraded volatile byproducts produced by cracking and decomposition of the higher molecular weight impurities undergoing thermal treatment in the tower. This overhead stream contains aldehydes, hydrocarbons, and a small amount of $C_8$ alcohol. It is passed to a condenser 6 wherein it is liquified, and from condenser 6 by lines 7 and 8 a part of the liquid is returned as reflux to tower 4 and a part is removed by lines 9 and 11 through pressure control valve 10 to release the pressure to atmospheric in line 11 before sending the overhead product to storage.

Stabilizer tower 4 is maintained at a pressure of around 50 p. s. i. g., such that the temperature of the liquid bottoms is at a temperature of at least 600° F. and the temperature at each plate up the column is kept at a level at least 100 Fahrenheit degrees above that which normally obtain at atmospheric pressure. The average residence time of material in tower 4 is about 1 hour.

In tower 18, the reflux ratio is about 1.5:1 and both the temperature and pressure are somewhat lower than in tower 4. In this tower the bottoms are at a pressure of 0–2 p. s. i. g. and the temperature is maintained around 450–550° F. not being permitted to rise above 550° F., the cracking temperature of the bottoms. The high boiling bottoms product is withdrawn through line 24 and passed in part through reboiler 29 and thence returned to tower 18 by return line 30. The remaining portion of the bottoms is rejected from the system through lines 25, cooler 26 and line 27. A part of the bottoms may be recycled, if desired, by line 31 to the feed inlet of tower 4. In this column the temperature is somewhat lower than in the column 4 and is maintained sufficiently low to avoid bottoms cracking and resulting contamination by volatile decomposition products. The purified $C_8$ Oxo alcohol is recovered from column 18 through line 19 as overhead, condensed in a condenser 20 and a part returned through lines 21 and 22 to tower 18 as reflux. The remaining portion of the purified overhead alcohol is collected from line 25a as $C_8$ Oxo alcohol product and sent to storage. Operating in this manner about 54 volume per cent of alcohol based on the feed to stabilizer tower 4 is recovered. About 27 volume per cent of the feed is obtained as overhead from tower 4 and about 19 volume per cent is obtained as bottoms product from tower 18.

By operating in such a manner as to subject the crude alcohol entering tower 4 to a temperature of about 600° F. prior to distillation for a time of about 1 hour, an alcohol product was recovered, and tested by a study of the ester Hazen color of the phthalate ester, prepared by refluxing the Oxo alcohol for one hour with phthalic anhydride. The results, compared with those from untreated alcohol are shown in Table II.

*Table II*

| Alcohol | Phthalate Ester Color (Hazen Pt-Co Scale) |
| --- | --- |
| Untreated | 500 |
| Heat Treated | 200 |

To summarize, the invention relates to distilling an impure Oxo alcohol containing high boiling impurities such as acetals, hemi-acetals, esters, and ethers which tend to undergo decomposition when exposed to high temperatures. In general, the Oxo alcohol is subjected to at least one distillation operating at sufficiently high pressure in the first stage to maintain the alcohol in liquid phase and for a sufficient period of time to decompose a major portion of the impurities to more volatile decomposition products. Hence the distillation is a time, temperature, pressure operation. A suitable temperature in the first stage distillation is about 600° F. under a pressure of about 50 lbs. per sq. in. From this stage, water, hydrocarbon and volatile decomposition products from the high boiling are taken off as vapors. In the second stage the alcohol product is distilled at somewhat lower temperature at about 450–550° F. and under about atmospheric pressure, whence the alcohol is taken off as overhead, condensed and collected as a relatively pure product.

What is claimed is:

1. An improved continuous distillation process for the purification of a mixture of crude water-immiscible $C_4$ to $C_{15}$ alcohols containing high boiling thermally unstable impurities including acetals, esters, hemi-acetals, and ethers, and obtained by the catalytic reaction of olefins with carbon monoxide and hydrogen and subsequent hydrogenation of the aldehydes resulting therefrom, which comprises introducing said mixture of crude alcohols into an initial distillation stage maintained at superatmospheric pressure and at temperatures substantially above the normal boiling point of the alcohol, heat treating therein the mixture of crude alcohols in the liquid phase for a period of time sufficient to decompose thermally a substantial portion of the high boiling impurities into more volatile products, removing by vaporization the impurities more volatile than the alcohol, passing the alcohol and the residual impurities less volatile than the alcohol to a second distillation stage maintained at atmospheric pressure, separating as overhead an alcohol rich vapor stream, and removing as a liquid bottoms product the residual undecomposed impurities boiling higher than the alcohol.

2. A process such as that described in claim 1 in which the alcohols in crude alcohol mixture being purified contains from eight to nine carbon atoms.

3. A process such as that described in claim 1 in which the mixture of crude alcohols is obtained by catalytic reaction of a $C_7$ olefin stream with carbon monoxide and hydrogen followed by hydrogenation of the $C_8$ aldehydes obtained therefrom.

4. An improved continuous distillation process for the purification of a mixture of crude water-immiscible $C_8$ iso-octyl alcohol obtained by the catalytic reaction of a $C_7$ olefin stream with carbon monoxide and subsequent hydrogenation of the $C_8$ aldehydes obtained therefrom, and containing high boiling, thermally unstable impurities including acetals, esters, hemi-acetals and ethers, which comprises introducing the mixture of crude iso-octyl alcohols into an initial distillation zone, maintained at pressures of from 20 to 200 lbs. per sq. in. and at a temperature of from 530° F. to 750° F., heat treating therein the mixture of crude alcohols in the liquid phase for a period of time sufficient to effect substantial decomposition, of the thermally unstable, high boiling impurities to more volatile components, removing overhead a vapor stream of impurities more volatile than the alcohol, removing the alcohol and residual impurities less volatile than the alcohol as liquid from the lower part of the distillation zone, introducing said liquid containing the alcohol into a second distillation zone maintained at atmospheric pressure, removing as overhead a substantially pure alcohol vapor stream, and removing as a liquid bottoms product the residual impurities less volatile than the alcohol.

5. A process as described in claim 4 in which the initial distillation zone is maintained at a pressure of 50 lbs. per sq. in. and the temperature is at least 600° F. and the pressure in the second distillation zone is maintained at 0 to 2 lbs. per sq. in and the temperature in the second distillation zone is continuously maintained below 550° F.

WARREN M. SMITH.

REFERENCES CITED

The following references are of record in the file of this patent:

UNITED STATES PATENTS

| Number | Name | Date |
| --- | --- | --- |
| 2,151,461 | Britton et al. | Mar. 21, 1939 |
| 2,417,886 | Redcay | Mar. 25, 1947 |